(12) United States Patent
Boswell et al.

(10) Patent No.: US 12,451,137 B2
(45) Date of Patent: Oct. 21, 2025

(54) SPEECH RECOGNITION SYSTEMS AND METHODS FOR CONCURRENT VOICE COMMANDS

(71) Applicant: HONEYWELL INTERNATIONAL INC., Charlotte, NC (US)

(72) Inventors: Steven Boswell, Phoenix, AZ (US); Sonia Dodd, Phoenix, AZ (US); Shell Stacey, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 352 days.

(21) Appl. No.: 18/156,674

(22) Filed: Jan. 19, 2023

(65) Prior Publication Data

US 2024/0249726 A1 Jul. 25, 2024

(51) Int. Cl.
*G10L 15/22* (2006.01)
*G10L 15/30* (2013.01)
*G10L 15/32* (2013.01)

(52) U.S. Cl.
CPC .............. *G10L 15/32* (2013.01); *G10L 15/22* (2013.01); *G10L 15/30* (2013.01)

(58) Field of Classification Search
CPC ................................ G10L 15/22; G10L 15/32
See application file for complete search history.

(56) References Cited

U.S. PATENT DOCUMENTS

| 4,130,884 A | 12/1978 | Hildinger |
| 6,421,645 B1 | 7/2002 | Beigi et al. |
| 7,299,187 B2 | 11/2007 | Tahara et al. |
| 7,458,029 B2 | 11/2008 | Agrawala et al. |
| 7,620,901 B2 | 11/2009 | Carpenter et al. |
| 8,347,215 B2 | 1/2013 | Carpenter et al. |
| 8,515,763 B2 | 8/2013 | Dong et al. |
| 9,392,326 B2 | 7/2016 | Lee et al. |
| 9,569,174 B2 | 2/2017 | Rogers et al. |
| 9,959,861 B2 | 5/2018 | Zhou et al. |

(Continued)

FOREIGN PATENT DOCUMENTS

| CN | 104570835 A | 4/2015 |
| CN | 113936650 A | 1/2022 |

(Continued)

*Primary Examiner* — Ibrahim Siddo
(74) *Attorney, Agent, or Firm* — Ingrassia Fisher & Lorenz, LLP

(57) ABSTRACT

Systems and methods are provided that support concurrent voice commands from different users. A speech recognition system includes a first input interface to receive a first audio input, a second input interface to receive a second audio input, an output interface, a first recognition module coupled to the first input interface and the output interface to determine a first textual representation of the first audio input and transmit a first message stream comprising the first textual representation and a first identifier associated with the first audio input via the output interface, and a second recognition module coupled to the second input interface and the output interface to determine a second textual representation of the second audio input and transmit a second message stream comprising the second textual representation and a different identifier associated with the second audio input via the output interface.

20 Claims, 1 Drawing Sheet

(56) References Cited

U.S. PATENT DOCUMENTS

| | | |
|---|---|---|
| 9,965,035 B2 | 5/2018 | Santamaria et al. |
| 9,983,664 B2 | 5/2018 | Kim et al. |
| 9,996,231 B2 | 6/2018 | Missig et al. |
| 10,074,367 B2 | 9/2018 | Tolyama |
| 10,127,564 B2 | 11/2018 | Heath |
| 10,191,619 B2 | 1/2019 | Yoon et al. |
| 10,205,827 B1* | 2/2019 | Pycko .................... G10L 15/30 |
| 10,445,355 B2 | 10/2019 | Miller et al. |
| 10,447,744 B2 | 10/2019 | Feldman et al. |
| 10,558,351 B2 | 2/2020 | Shan |
| 10,664,122 B2 | 5/2020 | Choi et al. |
| 10,969,945 B2 | 4/2021 | Bernstein et al. |
| 10,991,364 B1 | 4/2021 | Hoover et al. |
| 11,002,558 B2 | 5/2021 | Santamaria et al. |
| 11,144,535 B2 | 10/2021 | Gilbertson et al. |
| 11,221,729 B1 | 1/2022 | Bauchot et al. |
| 11,467,711 B2 | 10/2022 | Ma et al. |
| 11,714,539 B1 | 8/2023 | Boswell et al. |
| 11,960,668 B1 | 4/2024 | Boswell et al. |
| 2002/0036660 A1 | 3/2002 | Adan et al. |
| 2003/0066016 A1 | 4/2003 | Wehage |
| 2005/0180327 A1 | 8/2005 | Banerjee et al. |
| 2006/0168531 A1 | 7/2006 | Sato |
| 2006/0212291 A1 | 9/2006 | Matsuo |
| 2007/0052725 A1 | 3/2007 | Ostojic et al. |
| 2007/0153806 A1 | 7/2007 | Celinski et al. |
| 2007/0226636 A1 | 9/2007 | Carpenter et al. |
| 2007/0288129 A1 | 12/2007 | Komer et al. |
| 2010/0073359 A1 | 3/2010 | Suddreth et al. |
| 2010/0180210 A1 | 7/2010 | Toyama et al. |
| 2010/0293501 A1 | 11/2010 | Russ et al. |
| 2012/0110403 A1 | 5/2012 | Chen et al. |
| 2013/0104065 A1 | 4/2013 | Stecher |
| 2013/0162519 A1 | 6/2013 | Ameling et al. |
| 2013/0241840 A1 | 9/2013 | Durojaiye |
| 2014/0019873 A1 | 1/2014 | Gupta et al. |
| 2014/0040756 A1 | 2/2014 | Bukurak et al. |
| 2014/0169471 A1 | 6/2014 | He |
| 2014/0363799 A1 | 12/2014 | Brown |
| 2016/0034065 A1 | 2/2016 | Yin et al. |
| 2016/0267773 A1 | 9/2016 | Martin |
| 2016/0321841 A1 | 11/2016 | Christen et al. |
| 2016/0360382 A1 | 12/2016 | Gross et al. |
| 2020/0027378 A1* | 1/2020 | Castet .................... G06T 15/04 |
| 2020/0233501 A1 | 7/2020 | Jacobs |
| 2020/0249811 A1 | 8/2020 | Lemay et al. |
| 2020/0264738 A1 | 8/2020 | Lee et al. |
| 2021/0249009 A1* | 8/2021 | Manjunath ............... G06F 3/167 |
| 2021/0263600 A1 | 8/2021 | Starrett et al. |
| 2021/0342785 A1 | 11/2021 | Mann et al. |
| 2022/0100463 A1 | 3/2022 | Crouch et al. |
| 2022/0335926 A1 | 10/2022 | Saptharishi et al. |
| 2022/0374085 A1 | 11/2022 | Nguyen et al. |
| 2022/0388630 A1 | 12/2022 | Saptharishi et al. |
| 2024/0143157 A1 | 5/2024 | Boswell et al. |

FOREIGN PATENT DOCUMENTS

| | | |
|---|---|---|
| CN | 111338555 B | 3/2022 |
| CN | 114327235 A | 4/2022 |
| EP | 1487171 A1 | 12/2004 |
| EP | 3998527 A2 | 5/2022 |
| JP | 2013239137 A | 11/2013 |
| JP | 7051756 B2 | 4/2022 |
| WO | 2018213414 A1 | 11/2018 |
| WO | 2019063496 A1 | 4/2019 |
| WO | 2021184375 A1 | 9/2021 |
| WO | 2022005819 A1 | 1/2022 |
| WO | 2022143198 A1 | 7/2022 |

* cited by examiner

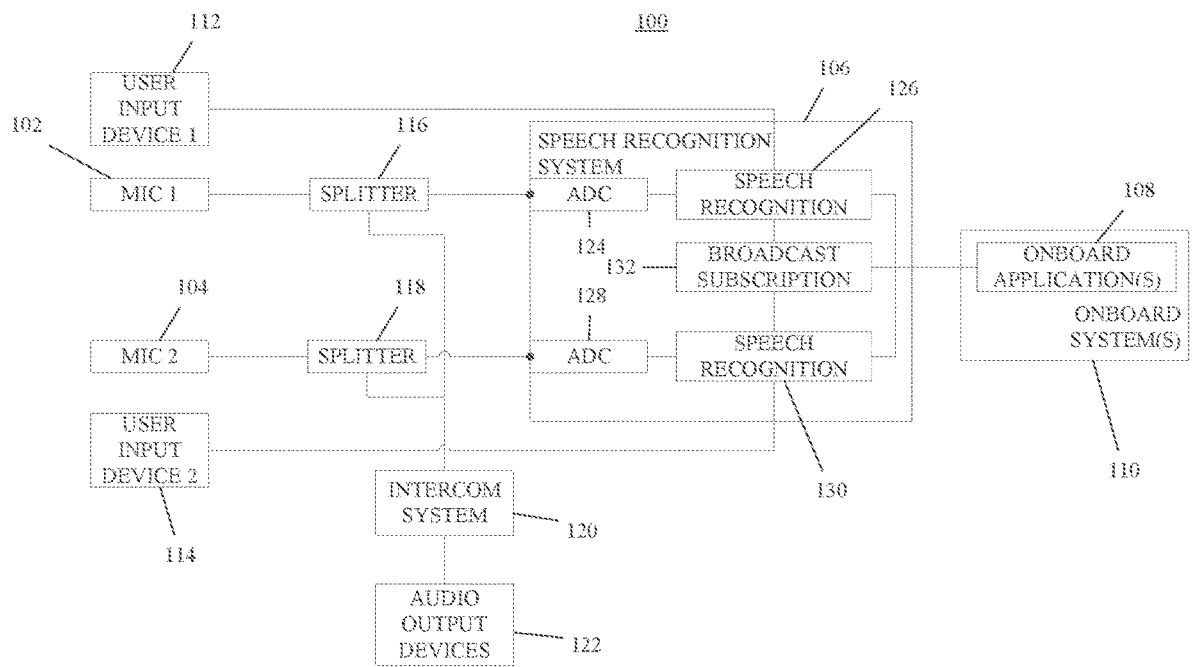

SPEECH RECOGNITION SYSTEMS AND METHODS FOR CONCURRENT VOICE COMMANDS

TECHNICAL FIELD

The subject matter described herein relates generally to vehicle systems, and more particularly, embodiments of the subject matter relate to aircraft speech recognition systems for dual pilot operations.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) are utilized to provide a number of different displays from which the user can obtain information or perform functions related to, for example, navigation, flight planning, guidance and navigation, and performance management. Electronic displays onboard vehicles are often small and compact due to limited available space and other constraints on locations where displays can be located. As a result, manipulating onboard electronic displays, such as a touchscreen display in an aircraft cockpit, in order to arrive at a desired selection can be time consuming, inefficient, and error prone. Voice command functionality has been developed to accommodate user preferences and facilitate user inputs as an alternative to mechanical, tactile or other manual inputs. For dual pilot operations, it is desirable to enable a pilot and co-pilot to independently use voice commands or other voice activated features to perform their tasks without interference with one another (e.g., due to noise, crosstalk, or the like). Furthermore, other desirable features and characteristics will become apparent from the subsequent detailed description and the appended claims, taken in conjunction with the accompanying drawings and this background.

BRIEF SUMMARY

Methods and systems are provided for concurrent voice commands from different users. An exemplary system includes a first input interface to be coupled to a first audio input device to receive a first audio input from the first audio input device, a second input interface to be coupled to a second audio input device to receive a second audio input from the second audio input device, an output interface, a first recognition module coupled to the first input interface and the output interface to determine a first textual representation of the first audio input and transmit a first message stream comprising the first textual representation and a first identifier associated with the first audio input via the output interface, and a second recognition module coupled to the second input interface and the output interface to determine a second textual representation of the second audio input and transmit a second message stream comprising the second textual representation and a second identifier associated with the second audio input via the output interface, wherein the second identifier is different from the first identifier.

In another embodiment, a non-transitory computer-readable medium is provided having computer-executable instructions stored thereon that, when executed by a processing system, cause the processing system to provide a speech recognition system including a first recognition module to obtain first audio input corresponding to a first voice command received via a first audio input device and a second recognition module to obtain second audio input corresponding to a second voice command received via a second audio input device different from the first audio input device. The first recognition module determines a first textual representation of the first voice command based on the first audio input and broadcasts, over a communications bus, a first message stream including the first textual representation of the first voice command in association with a first identifier associated with the first audio input device. The second recognition module determines a second textual representation of the second voice command based on the second audio input and broadcasts, over the communications bus, a second message stream including the second textual representation of the second voice command in association with a second identifier associated with the second audio input device. The second identifier is different from the first identifier.

In another embodiment, a method is provided that involves receiving, via a first input interface of a speech recognition system, a first audio input from a first audio input device coupled to the first input interface, determining, at the speech recognition system, a first textual representation of the first audio input, determining, at the speech recognition system, a first identifier associated with the first audio input device, wherein the first identifier is different from respective identifiers associated with one or more other audio input devices coupled to respective input interfaces of the speech recognition system, and transmitting, by the speech recognition system via an output interface of the speech recognition system, a first message stream including the first identifier, wherein the first message stream comprises the first textual representation.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing FIGURE, wherein FIG. 1 is a block diagram of an exemplary voice command system suitable for use onboard a vehicle such as an aircraft in an exemplary embodiment.

DETAILED DESCRIPTION

Embodiments of the subject matter described herein generally relate to systems and methods that enable concurrent or simultaneous speech recognition and corresponding voice commands from multiple different users. For purposes of explanation, the subject matter may be described herein in the context of a pilot and a co-pilot using voice commands to interact with or otherwise control onboard systems that make up a cockpit flight deck of an aircraft during dual pilot operation. However, it should be appreciated that although the subject matter is described herein primarily in the context of a flight deck, an electronic flight bag (EFB) or other avionics onboard an aircraft in an aviation context, it should be understood that the subject matter described herein is not limited to vehicle systems or applications and may be similarly utilized in other applications, systems or environments, including, but not limited to use with other types of vehicles (e.g., automobiles, marine vessels, trains, etc.). That said, enabling speech recognition and flight deck controls for multiple pilots concurrently, yet independently from one another, is capable of expanding the use of speech for flight deck controls, which, in turn, may reduce aircraft weight and save fuel costs (e.g., by reducing human-machine interface hardware) and reduce operator fatigue while decreasing time on task and increasing overall flight safety.

FIG. 1 depicts an exemplary embodiment of a voice command system 100 suitable for use with an aircraft or other vehicle to receive speech, voice or other audio from human users via audio input devices 102, 104 and provide, via a speech recognition system 106, corresponding voice commands or other textual transcriptions of the received audio to the appropriate destination software applications 108 executing at or on various systems 110 onboard the vehicle, such as an avionics system onboard an aircraft. In exemplary implementations, each audio input device 102, 104 is associated with a particular user, for example, a first audio input device 102 may be associated with a pilot of the aircraft (e.g., the captain or pilot in command), while the second audio input device 104 may be associated with a co-pilot of the aircraft. As described in greater detail below, each audio input device 102, 104 has its own unique communications channel associated with it at the speech recognition system 106, such that audio input from the first input device 102 can be processed independently and concurrently (or in parallel) with audio input from the second input device 104, thereby allowing voice commands to be separately received at the speech recognition system 106 from the different audio input devices 102, 104 at the same time (or overlapping in time). Thus, a pilot and co-pilot may simultaneously and independently issue different overlapping voice commands that can be received and processed at the speech recognition system 106 without crosstalk or other interference between voice commands.

The audio input devices 102, 104 generally represent any sort of microphone, audio transducer, audio sensor, or the like capable of receiving voice, speech or other audio input. In this regard, the audio input devices 102, 104 allow a pilot or other vehicle operator to provide user input to the system 100 in a "hands free" manner using speech recognition by annunciating the desired voice commands or other input desired to be received by the appropriate onboard application 108 and/or onboard system 110. In exemplary implementations, the voice command system 100 includes a user input device 112 to receive a user input from the pilot or other user associated with the first audio input device 102 and provide a corresponding indication to the speech recognition system 106 of an incoming voice command to be provided via the first audio input device 102 (e.g., push-to-command). Depending on the embodiment, the user input device 112 may be realized as a button, switch, keypad, touchpad, keyboard, mouse, touch panel (or touchscreen), joystick, knob, line select key or another suitable device adapted to receive input from a user. Similarly, the voice command system 100 includes a second user input device 114 to receive a second user input from the co-pilot or other user associated with the second audio input device 104 and provide a corresponding indication to the speech recognition system 106 of an incoming voice command to be provided via the second audio input device 104.

In exemplary embodiments, the audio output interface associated with the first audio input device 102 is connected or otherwise coupled to an audio splitter 116 that provides a first version of the audio signals received via the first audio input device 102 to a first audio input interface of the speech recognition system 106 while providing a second version of the audio signals received via the first audio input device 102 to a first audio input interface of an intercom system 120. Similarly, the audio output interface associated with the second audio input device 104 is connected or otherwise coupled to a second audio splitter 118 that provides a first version of the audio signals received via the second audio input device 104 to a second audio input interface of the speech recognition system 106 while providing a second version of the audio signals received via the second audio input device 104 to a second audio input interface of the intercom system 120.

The intercom system 120 generally represents the hardware, software, and/or firmware components of the voice command system 100 that are configured to mix or otherwise combine the different audio signals from the audio input devices 102, 104 via the splitters 116, 118 into a consolidated audio signal that is broadcast or otherwise reproduced via one or more audio output devices 122. In this manner, the audio output devices 122 reproduce the received audio for other users, such that the pilot or other crew members can hear voice commands or other speech annunciated by the co-pilot, and vice versa.

The audio output devices 122 may be realized as any sort of speaker, headphone, earphone, earbud, or other suitable device capable of providing auditory output to a user. In this regard, in exemplary embodiments, the voice command system 100 includes a first instance of an audio output device 122 associated with the pilot or other user of the first audio input device 102, such as, for example, a headphone, an earphone, an earbud or another head-worn audio output device that is integrated with the audio input device 102 on a headset to be worn by the pilot. Similarly, a second instance of an audio output device 122 may be integrated with the second audio input device 104 on a second headset to be worn by the co-pilot. In this regard, in some implementations, the user input devices 112, 114 for initiating or otherwise providing indication of an incoming voice command may be similarly integrated or otherwise combined with the respective audio input device 102, 104 and/or the respective audio output device 122 at a headset or other hardware worn by the respective user. It should be appreciated that in practice, an aircraft may include numerous different types of audio input devices, audio output devices and/or user input devices onboard in the cockpit of the aircraft, and the number and type of audio output devices may vary depending on the make, the model, and/or the operator of the aircraft, and potentially other factors, and as such, the subject matter described herein is not limited to any particular type, number, or configuration of audio input devices, audio output devices and/or user input devices.

The speech recognition system 106 generally represents the hardware, software, and/or firmware components of the voice command system 100 that are configured to receive input audio signals corresponding to a voice command, convert the received voice command audio into a corresponding textual representation, and transmit or otherwise provide the textual voice command to one or more destination applications 108 executing on or at one or more onboard systems 110. Depending on the embodiment, the speech recognition system 106 may include or otherwise be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The speech recognition system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the speech recognition system 106 includes processing logic that may be configured to carry out the functions, techniques, and processing tasks associated with the operation of the voice command system 100, as described in greater detail below. Furthermore, the steps of a method or algorithm described in connection with the embodiments disclosed herein may be embodied directly in hardware, in firmware, in a software module executed by the speech recognition system 106, or in any practical combination thereof. For example, in one or more embodiments, the speech recognition system 106 includes or otherwise accesses a data storage element (or memory), which may be realized as any sort of non-transitory short or long term storage media capable of storing computer-readable (or machine-readable) programming instructions for execution by the speech recognition system 106. The code or other executable programming instructions, when read and executed by the speech recognition system 106, cause the speech recognition system 106 to execute, generate or otherwise support speech recognition modules 126, 130 associated with the respective audio input devices 102, 104 to support or otherwise perform certain tasks, operations, functions, and/or processes described herein.

The onboard systems 110 generally represent the avionics systems or other hardware systems associated with the aircraft that may receive user input from a pilot, co-pilot or other crew member in the cockpit of the aircraft. For example, practical embodiments of a voice command system 100 associated with an aircraft will likely include one or more of the following onboard avionics systems 108 suitably configured to support operation of the aircraft: a display system, a communications system, a navigation system, a flight management system (FMS), a weather system, an air traffic management system, a radar system, a traffic avoidance system, an autopilot system, an autothrust system, a flight control system, a hydraulics system, a pneumatics system, an environmental system, an electrical system, an engine system, a trim system, a lighting system, a crew alerting system, an electronic checklist system, an electronic flight bag and/or another suitable avionics system. The destination applications 108 generally represent the respective software and/or firmware components executing on or at a respective onboard system 110 that is configurable to receive a textual representation of a voice command and translate the voice command text into a corresponding response or action at the respective onboard system 110, the details of which are not germane to the subject matter described herein.

The speech recognition system 106 includes a first analog-to-digital converter (ADC) 124 having an audio input interface that is connected or otherwise coupled to the output of the splitter 116 to receive audio signals corresponding to the first audio input from the first audio input device 102. The ADC 124 converts the received audio signals into a corresponding digital representation that is output, transmitted or otherwise provided to a first speech recognition module 126 that converts the digital representation of the received audio input into a corresponding textual representation. In this regard, the speech recognition module 126 generally represents the software components of the speech recognition system 106 that are configurable to process the output of the ADC 124 to transform or otherwise convert the digitized audio of a received voice command into a corresponding textual representation of the voice command. For example, the speech recognition module 126 may implement or otherwise support a speech recognition engine (or voice recognition engine) or other speech-to-text system, which, in turn, may utilize various filters, speech recognition vocabularies, neural networks, natural language processing (NLP), and/or the like to analyze, parse, or otherwise process the digitized audio input to convert the audio content into a corresponding textual representation. In response to receiving an indication of an incoming voice command from the user input device 112, the speech recognition module 126 samples, monitors or otherwise listens to the output of the ADC 124 for a period of time until detecting or otherwise identifying an indication that the voice command is complete (e.g., an absence of audio input, an elapsed listening window timer, deactivation of the user input device 112, or the like), and then converts the audio content captured or sampled during that period of time into a corresponding textual representation.

In a similar manner, for each additional audio input device 104, the speech recognition system 106 includes a corresponding ADC 128 having an audio input interface that receives audio signals corresponding to the respective audio input from the respective audio input device 104. In this regard, although FIG. 1 depicts an implementation having two audio input devices 102, 104, in practice, the speech recognition system 106 may be configured to support any number of different audio input devices with distinct speech recognition channels allocated to a respective audio input device to maintain separation or isolation of the audio received via the respective audio input device from any other audio input devices. As described above, the second ADC 128 converts the received audio signals from the second audio input device 104 into a corresponding digital representation that is output, transmitted or otherwise provided to a second speech recognition module 130 that converts the digital representation of the received audio input into a corresponding textual representation. In this regard, by virtue of the second speech recognition module 130 being associated with a different audio input device 104 associated with a corresponding user input device 114 having dedicated signal paths that are distinct from the audio input device 102 and user input device 112 associated with the first speech recognition module 126, the second speech recognition module 130 independently receives and processes the audio input from the second audio input device 104 without any interference, noise or crosstalk from the first audio input device 102, and vice versa.

In exemplary embodiments, after determining a textual representation of a received audio input, a respective speech recognition module 126, 130 is configured to transmit or otherwise provide a message stream including the textual representation of the received audio input to the appropriate destination onboard application 108. In this regard, the message stream includes one or more messages, where a respective message of the message stream includes at least a portion of the textual representation of the received audio input and a unique identifier associated with the respective audio input device 102, 104 associated with the received audio input. In exemplary implementations, the speech recognition system 106 includes a common shared output interface that is coupled to the output of each of the speech recognition modules 126, 130. The output interface of the speech recognition system 106 may be connected or otherwise coupled to a communications bus, where each of the onboard systems 110 having an associated application 108 capable of receiving voice commands is connected or otherwise coupled to the communications bus. In this manner, the onboard application 108 that is the intended destination for a voice command receives the message stream for the voice command from the speech recognition system 106 via the communications bus.

In exemplary embodiments, the speech recognition system 106 is configured to support a publish-subscribe messaging scheme, where a respective speech recognition module 126, 130 broadcasts a respective message stream including the textual representation of the audio input received by the respective speech recognition module 126, 130 with an identifier that is utilized by the destination onboard applications 108 to determine whether or not to receive and respond to the respective message stream. In this regard, the message streams broadcast by the first speech recognition module 126 may include an identifier that uniquely identifies the first audio input device 102 and/or the first speech recognition module 126 as the source of the respective voice command, while the message streams broadcast by the second speech recognition module 130 may include a different identifier that uniquely identifies the second audio input device 104 and/or the second speech recognition module 130 as the source of the respective voice command. For example, in some implementations, a unique message stream identifier associated with a respective audio input device 102, 104 may be included with messages in the message stream to allow the onboard applications 108 to determine which message streams should be responded to and which message streams should be ignored by the respective application 108.

In one or more exemplary implementations, the speech recognition system 106 stores or otherwise maintains (e.g., in a data storage or memory associated with the speech recognition system 106) broadcast subscription data 132 that includes information utilized by the speech recognition modules 126, 130 and/or the onboard applications 108 to manage the identifiers assigned to the different message streams and ensure input voice commands are received by the appropriate destination application 108. For example, when a pilot or other user associated with the first audio input device 102 interacts with an onboard application 108 to enable or otherwise initiate voice commands with respect to the onboard application 108, the onboard application 108 may transmit or otherwise provide, to the speech recognition system 106, indication of the user interacting with the onboard application 108 to register the onboard application 108 to be subscribed to the particular audio input device 102 associated with that user. In response, the speech recognition system 106 updates the broadcast subscription data 132 to include an entry maintaining an association between the unique identifier associated with the audio input device 102 and a respective identifier associated with the subscribed onboard application 108. In this regard, in some embodiments, the speech recognition system 106 may utilize the identifier associated with the audio input device 102 and/or the identifier associated with the subscribed onboard application 108 to generate or otherwise create a unique message stream identifier to be utilized when publishing messages related to the audio input device 102.

When the pilot manipulates or actuates a user input device 112 to initiate a voice command via the audio input device 102, the speech recognition module 126 may utilize the broadcast subscription data 132 to identify the appropriate message stream identifier to be assigned to messages associated with the audio input device 102 and then publish, broadcast, or otherwise transmit a message via the communications bus that includes notification of an incoming voice command in association with that message stream identifier. The subscribed onboard application 108 monitoring the communications bus listening for that message stream identifier identifies the message and initiates one or more responses at the respective onboard application 108, for example, by configuring or transitioning the state of the onboard application 108 in preparation for receiving a voice command. Thereafter, as the speech recognition module 126 converts the received audio signals from the audio input device 102 into a corresponding textual representation of the received voice command, the speech recognition module 126 publishes, broadcasts or otherwise transmits a message stream via the communications bus, where messages of the stream include the message stream identifier and discrete portions of the textual representation of the received voice command to be reconstructed into the received voice command at the subscribed onboard application 108.

In a similar manner, when a co-pilot or other user interacts with an onboard application 108 to enable or otherwise initiate voice commands with respect to the onboard application 108, the onboard application 108 may similarly subscribe to the corresponding audio input device 104 at the speech recognition system 106. Thereafter, when the co-pilot manipulates or actuates a user input device 114 to initiate a voice command via the second audio input device 104, the speech recognition module 130 may utilize the broadcast subscription data 132 to identify the appropriate message stream identifier to be assigned to messages associated with the audio input device 104 and then publish, broadcast, or otherwise transmit a message stream via the communications bus that includes that message stream identifier in association with the textual representation of the received voice command determined by the speech recognition module 130.

By virtue of the separate audio channels and separate signal processing paths, the pilot associated with the first audio input device 102 may issue voice commands concurrently to or simultaneously with the co-pilot associated with the second audio input device 104, for example, to interact with or otherwise control a particular onboard application 108 at an onboard system 110 independently while the co-pilot interacts with or otherwise controls a different application 108 at the same or different onboard system 110. In this regard, it should be noted that in practice, it may be possible for the pilot and co-pilot to issue voice commands simultaneously or concurrently with respect to the same application 108 at the same time (or overlapping in time). In response to concurrent voice commands, the destination onboard application 108 may utilize the identifiers associated with the respective message streams to disambiguate voice commands and implement or otherwise perform one or more deconfliction processes to determine which voice command to respond to, or in which order the different voice commands should be executed, the details of which are not germane to this disclosure.

For the sake of brevity, conventional techniques related to user interfaces, speech, voice or other audio processing, speech or voice recognition, avionics systems, and other functional aspects of the systems (and the individual operating components of the systems) may not be described in detail herein. Furthermore, the connecting lines shown in the various FIGURES contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the FIGURES may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A system comprising:
    a first splitter coupled to a first audio input device, an intercom system and a first input interface to provide a first audio signal received from the first audio input device to each of the intercom system and the first input interface;
    a second splitter coupled to a second audio input device, the intercom system and a second input interface to provide a second audio signal received from the second audio input device to each of the intercom system and the second input interface, wherein the intercom system is configured to combine the first audio signal and the second audio signal into a consolidated audio signal;
    a first analog-to-digital converter (ADC) coupled to the first input interface to convert the first audio signal into a first input corresponding to the first audio signal;
    a second analog-to-digital converter (ADC) coupled to the second input interface to convert the second audio signal into a second input corresponding to the second audio signal;
    a shared output interface to be coupled to a communications bus;
    a first recognition module coupled to the first ADC and the shared output interface to determine a first textual representation of the first audio signal based on the first input and transmit a first message stream comprising the first textual representation and a first identifier associated with the first audio signal via the shared output interface; and
    a second recognition module coupled to the second ADC and the shared output interface to determine a second textual representation of the second audio signal based on the second input and transmit a second message stream comprising the second textual representation and a second identifier associated with the second audio signal via the shared output interface, wherein the second identifier is different from the first identifier.

2. The system of claim 1, wherein:
    the first recognition module broadcasts the first message stream comprising the first textual representation and the first identifier associated with the first audio signal over the communications bus; and
    the second recognition module broadcasts the second message stream comprising the second textual representation and the second identifier associated with the second audio signal over the communications bus.

3. The system of claim 1, further comprising a first user input device coupled to the first recognition module, wherein the first recognition module is configurable to initiate sampling the first audio signal in response to a first user input received via the first user input device.

4. The system of claim 3, further comprising a second user input device coupled to the second recognition module, wherein:
    the second user input device is different from the first user input device; and
    the second recognition module is configurable to initiate sampling the second audio signal in response to a second user input received via the second user input device.

5. The system of claim 1, further comprising a data storage element to maintain subscription information in response to subscription requests from one or more onboard systems coupled to the shared output interface via the communications bus.

6. The system of claim 5, wherein:
    the first recognition module broadcasts the first message stream comprising the first textual representation and the first identifier associated with the first audio signal over the communications bus; and
    a first onboard application at the one or more onboard systems subscribed to the first identifier is configurable to receive the first message stream and initiate one or more actions associated with a voice command corresponding to the first textual representation.

7. The system of claim 6, wherein:
the second recognition module broadcasts the second message stream comprising the second textual representation and the second identifier associated with the second audio signal over the communications bus; and
a second onboard application at the one or more onboard systems subscribed to the second identifier is configurable to receive the second message stream and initiate one or more actions associated with a second voice command corresponding to the second textual representation.

8. The system of claim 1, wherein the first audio signal and the second audio signal are concurrently received, and the first recognition module determines the first textual representation of the first audio signal independent of the second recognition module determining the second textual representation of the second audio signal.

9. The system of claim 1, wherein the first audio input device is associated with a first user and the second audio input device is associated with a second user different from the first user.

10. The system of claim 1, wherein the consolidated audio signal is reproduced via one or more audio output devices.

11. The system of claim 3, wherein the consolidated audio signal is reproduced via an audio output device integrated with the first user input device at a headset.

12. The system of claim 1, wherein the first identifier uniquely identifies the first audio input device and the second identifier uniquely identifies the second audio input device.

13. The system of claim 1, further comprising an avionics system coupled to the shared output interface via the communications bus, wherein a destination software application at the avionics system is configured to disambiguate a voice command corresponding to the first textual representation concurrent to a second voice command corresponding to the second textual representation using the first identifier.

14. The system of claim 1, further comprising the intercom system including a first audio input interface coupled to the first splitter to receive the first audio signal and a second audio input interface coupled to the second splitter to receive the second audio signal.

15. A non-transitory computer-readable medium having computer-executable instructions stored thereon that, when executed by a processing system, cause the processing system to provide a speech recognition system comprising:
a first recognition module coupled to a first analog-to-digital converter (ADC) coupled to a first splitter to obtain first audio input corresponding to a first voice command comprising a first audio signal received via a first audio input device coupled to the first splitter, determine a first textual representation of the first voice command based on the first audio input, and broadcast, via a shared output interface coupled to a communications bus, a first message stream comprising the first textual representation of the first voice command in association with a first identifier associated with the first audio input device; and
a second recognition module coupled to a second analog-to-digital converter (ADC) coupled to a second splitter to obtain second audio input corresponding to a second voice command comprising a second audio signal received via a second audio input device coupled to the second splitter, wherein the second audio input device is different from the first audio input device, determine a second textual representation of the second voice command based on the second audio input, and broadcast, via the shared output interface coupled to the communications bus, a second message stream comprising the second textual representation of the second voice command in association with a second identifier associated with the second audio input device, wherein the second identifier is different from the first identifier.

16. The computer-readable medium of claim 15, wherein the computer-executable instructions cause the processing system to determine the first identifier based at least in part on the first audio input device in response to a first subscription request from an avionics system coupled to the communications bus.

17. The computer-readable medium of claim 15, wherein the first audio input device is associated with a first user and the second audio input device is associated with a second user different from the first user.

18. The computer-readable medium of claim 15, wherein the first recognition module determines the first textual representation concurrent to the second recognition module determining the second textual representation.

19. A method comprising:
receiving, via a first input interface of a speech recognition system corresponding to a first speech recognition channel distinct from a second speech recognition channel associated with a second input interface of the speech recognition system, a first audio signal from a first audio input device coupled to the first input interface, wherein a second audio input device different from the first audio input device is coupled to the second input interface;
determining, at the speech recognition system, a first textual representation of the first audio signal;
determining, at the speech recognition system, a first identifier associated with the first audio input device, wherein the first identifier uniquely identifies the first audio input device and is different from a second identifier associated with the second audio input device coupled to the second input interface of the speech recognition system; and
transmitting, by the speech recognition system via a shared output interface of the speech recognition system coupled to a communications bus, a first message stream including the first identifier uniquely identifying the first audio input device, wherein the first message stream comprises the first textual representation.

20. The method of claim 19, further comprising:
receiving, at the speech recognition system, a subscription request for the first audio input device from a system onboard a vehicle, wherein the system is coupled to the shared output interface of the speech recognition system; and
providing, by the speech recognition system, the first identifier to the system in response to the subscription request, wherein the system is configurable to monitor the shared output interface to receive the first message stream using the first identifier.

* * * * *